June 28, 1960 S. ROBERTS 2,943,232

COLOR CATHODE RAY IMAGE DISPLAY SYSTEM

Filed Feb. 16, 1959 3 Sheets-Sheet 1

Inventor:
Shepard Roberts,
by Paul A. Frank
His Attorney.

Inventor:
Shepard Roberts,
by Paul A. Frank
His Attorney.

June 28, 1960 S. ROBERTS 2,943,232

COLOR CATHODE RAY IMAGE DISPLAY SYSTEM

Filed Feb. 16, 1959 3 Sheets-Sheet 3

Inventor:
Shepard Roberts,
by Paul A. Frank
His Attorney.

2,943,232

COLOR CATHODE RAY IMAGE DISPLAY SYSTEM

Shepard Roberts, Scotia, N.Y., assignor to General Electric Company, a corporation of New York Filed Feb. 16, 1959, Ser. No. 793,578

13 Claims. (Cl. 315—13)

This invention pertains to a color cathode ray image display system of the type in which electron streams of differing velocities impinge upon a viewing screen to excite different phosphor layers producing light of different colors, respectively. Cathode ray tubes utilized in such system may be denominated as "Penetron" multilayer type color tubes.

In this form of color cathode ray tube, the viewing screen is provided with phosphors that are selectively excited by cathode ray or electron beams of differing velocities. One phosphor layer, for example, may produce blue light when struck by electrons of a 20 kv. electron beam. Another may produce yellow light when struck by electrons of a 10 kv. electron beam. With tubes of this type a multicolored image, such as a television image, can be produced by the viewing screen when electron streams of 20 kv. energy and 10 kv. energy, respectively, are modulated in intensity in accordance with the yellow and blue color content of a signal image, respectively, and are swept in unison over the viewing screen in a scanning raster. Tubes of this type offer advantages of greater electron efficiency than most other color cathode ray tubes and, in addition, do not require any physical alignment between image elements of the screen and other apparatus.

When electron beams of different velocity are deflected by the same deflection elements (whether electrostatic or magnetic) the deflection depends upon the velocity of the beams. In consequence, it is not possible, in prior art cathode ray devices of this type, to sweep the beams to like extents by any single set of deflection elements. In accordance with the one aspect of the present invention, this difficulty is overcome and the beams are converged at the viewing screen by the action of two types of elements. One set of elements serves as the main deflecting system and sweeps the electron beams in usual fashion over the viewing screen to define the scanning raster. This deflection system may introduce some divergence between the respective beams. The second set of elements serve primarily as differential deflecting elements to compensate for any divergence of the beams under the influence of the first elements. The electron beams accordingly issue from the neck-like portion of the tube as a substantially coincident pair of high and low velocity beams, they are deflected by the first and main deflection elements to execute sweep movements and are collimated at the viewing screen by the action of the second deflecting elements.

In accordance with another aspect of the present invention the plural cathode ray beams are concentric in relationship, facilitating coincidence at the viewing screen. One beam is generated by a first electron gun which imparts an initial energy of, say, a 10 kv. to the electron beam. The second electron beam is generated by a second electron gun through which the first beam travels. This gun imparts a total energy of, say, 10 kv. to the electrons thereof and an additional 10 kv. energy to the electrons comprising the beam from the first electron gun. The result is a pair of concentric electron streams, one traveling at a low velocity corresponding to, say, 10 kv. and the other travelling at a high velocity corresponding to 20 kv. energy.

In accordance with one preferred form of the present invention, the substantially coincident low and high velocity electron streams pass into the zone of influence of a set of magnetic deflection coils immediately upon issuing from the second electron gun. These coils receive saw-tooth sweep currents that impart scanning movements to the electron beams, the field values being such as to deflect the respective beams to a somewhat greater extent than is required for the size of the raster to be scanned. An electron lens is located substantially coincident with the magnetic deflection coils. The lens receives a time-independent voltage tending to deflect the electron beams towards the axis of the tube and to an extent determined by the initial deflection of the electron beams from the tube axis and their respective velocities. The electron lens voltage is chosen to deflect the ray beams in the converging direction in amount sufficient to overcome the diverging deflection associated with the action of the time varying magnetic fields. The beams accordingly substantially converge on the viewing screen under all sweep conditions.

An alternative embodiment of the present invention likewise uses magnetic deflection coils. In this instance, however, the electron beams are converged by electrostatic deflection plates which also receive time-varying sweep voltages. The latter voltages are in direction and amount to overcome the diverging effects of the magnetic fields. The electron beams accordingly converge substantially on the viewing screen despite the diverging effects of the magnetic sweep coils.

It is therefore an object of the present invention to provide an improved color cathode ray image display system of the multi-energetic electron beam type in which a two-part deflection system serves to deflect the electron beams while maintaining their coincidence at the viewing screen.

Still another object of the present invention is to provide an improved color cathode ray image display system in which two concentric cathode ray beams of differing velocities impinge upon a viewing screen to excite phosphors producing light of differing colors, respectively.

Yet another object of the present invention is to provide an improved apparatus for generating a pair of concentric cathode ray beams having differing velocities, and for accelerating such beams to a viewing screen where different colors of light are produced thereby.

Still another object of the present invention is to provide an improved apparatus for developing a composite electron beam composed of high energy electrons and low energy electrons in which the low energy electron component is modulated in iris-like fashion to vary the value thereof without affecting the high energy component.

Another object of the present invention is to provide an improved multicolor cathode ray tube image display system in which electron beams of unlike velocities are created in substantially concentric relation, the beams are deflected by a time-varying sweep system that diverges the same in accordance with the deflection, and beam coincidence is restored at the viewing screen by a time-constant space-varying field active upon the electron beams after at least some deflection and in differential fashion in relation to the beams.

Further it is an object of the present invention to provide a system of the foregoing type having features of construction, combination and arrangement by which a highly effective satisfactory multicolor cathode ray image is produced at a minimum sweep power requirement, with a minimum of apparatus, and in a manner giving rise to an image that is sharp, devoid of pattern effects, and is produced with high efficiency.

The novel features which I believe to be characteristic of my invention are set forth with particularity in the appended claims. My invention itself, however, together with further objects and advantages thereof, will best be understood by reference to the following description taken in connection with the accompanying drawings in which:

*The overall image display system*

Figures 1, 2:
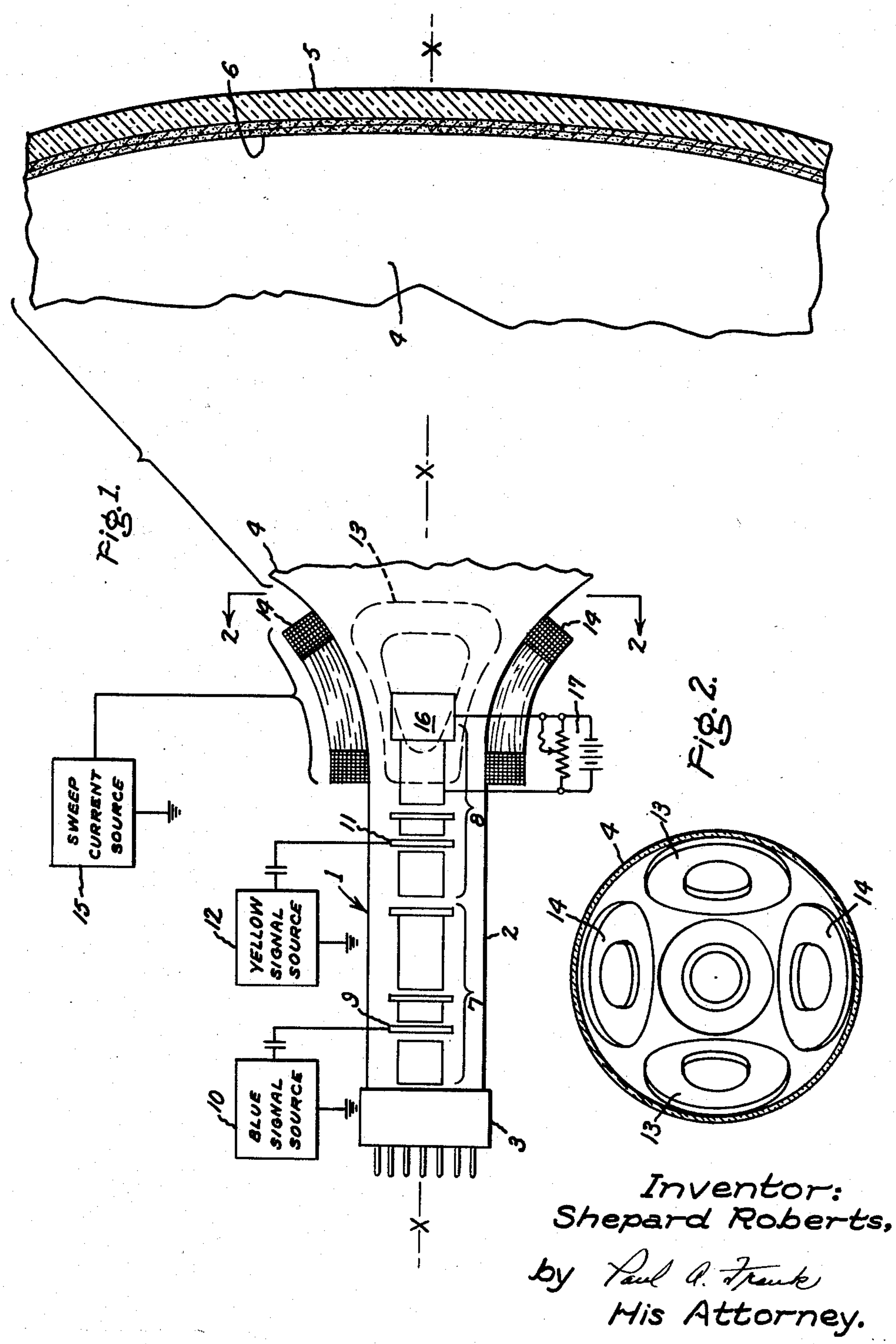
Fig. 1 is a somewhat diagrammatic view with parts broken away of a Penetron multi-layer type color cathode ray tube and the associated energizing devices constructed in accordance with a preferred form of the present invention.
Fig. 2 is a cross-sectional view through axis 2—2, Fig. 1.

The image display system includes a cathode ray tube indicated generally at 1, Fig. 1, having a neck-like portion 2 of elongated cylindrical conformation. At one end of the neck-like portion 2, the tube has a base 3 of conventional type with prongs to be received on the mating socket provided for the circuit connections to the tube. As shown, the tube flares out in the bell-shaped portion 4 and at its extreme other end has a face plate 5 which may be somewhat curved as shown. Preferably, the neck 2, the bell 4, and face plate 5 of the tube are all of glass. The interior of the tube is evacuated to define a space within which the electron streams may be developed and through which they travel without substantial losses.

The face plate 5 of tube 1 serves as a viewing screen. On its inside surface this face plate receives the phosphor coating 6. This coating is of materials which produce light when struck by the electron beams. To this end, the coating 6 is in the form of at least two layers, one being responsive to electrons of one energy range and the other being responsive to electrons of a different energy range. For example, the layer adjacent the base 5 may be composed of zinc sulfide activated with approximately 0.1 wt. percent silver to produce a blue image when struck by electrons having energies ranging from say, 10 to 20 kv. The second layer, facing the neck portion 2 of the tube, may, for example, be of zinc cadmium sulfide activated with approximately 1.0 wt. percent of manganese to produce a yellow fluorescent image when struck by electrons having a range of energies of from 1 to 10 kv., for example. The latter layer passes the higher energy electrons without substantial resistance or light production. While, as set forth herein, the multi-energy beam may be composed of two components, each of which may vary over a range, for ease of presentation in the description and claims, the two energy components will be treated as specific fixed energies. Thus, for example, in the above example the high energy component will be referred to as a 20 kv. beam and the low energy component as a 10 kv. beam.

The specific arrangement of the fluorescent coating 6 forms no part of the present invention. It is sufficient to note that it may be of the two-layer construction described above or, in the alternative, may be of some other construction capable of producing light of one color when struck by a beam of one velocity electrons and a different color when struck by a beam of another velocity electrons.

The neck portion 2 of the tube 1 receives the electron beam forming and accelerating devices. These are shown generally at 7, and 8, respectively, Fig. 1. The electron beam forming mechanism or electron gun 7, as hereinafter described, forms an electron beam of circular cross-section which, in the absence of deflection, travels along the axis X—X of the tube 1. Also as hereinafter described, this beam forms the high velocity, high energy component of the composite electron beam. The second electron gun, indicated generally at 8, includes centrally apertured elements which permit the electron beam from gun 7 to pass therethrough. This gun generates a low velocity electron beam of generally circular cross-section which merges with the electron beam from gun 7. Thus, the two electron guns serve to produce a composite electron beam having a high velocity portion from the gun 7 and a low velocity portion from the electron gun 8. In the absence of deflection the electron streams are directed along the axis X—X. While it may seem improper that the two beams of different energies and velocities generated by electron guns 7 and 8 should merge and occupy the same space, experiment has shown that this arrangement is entirely proper. Actually the electron density of both beams is so low that the two beams readily occupy the same space at the same time with no detectable effect upon one another.

The electron gun 7 has a control electrode 9 that modulates or varies the intensity of the electron stream in accordance with an applied voltage. This electrode is supplied with a time-varying voltage from the blue signal source 10 to vary the intensity of the electron beam from gun 7 in accordance with the modulation or signal information to be imparted to the blue beam as it is swept in a scanning raster over the viewing screen. Similarly, the electron gun 8 has a control electrode 11 which varies the intensity of the electron beam produced by that gun in accordance with applied voltage. The control electrode 11 receives voltage from the yellow signal source 12 to modulate or vary the intensity of the second electron beam with time in accordance with the yellow signal information.

As hereinafter described in further detail, the electron streams from guns 7 and 8 travel into the zone of influence of the vertical sweep windings 13 and the horizontal sweep windings 14 promptly upon issuing from the electron gun 8. These windings receive time-varying sweep current from the sweep current source 15. This source produces two time varying currents, one for the vertical coils 13 and the other for the horizontal coils 14. For example, for a television display system the vertical coils 13 may receive a saw-tooth current wave having approximately sixty repetitions per second, whereas the horizontal windings 14 may receive a saw tooth current wave having a repetition rate of approximately 13,000 per second. These act on the issuing electron streams to deflect them in unison (but not always to the same extent) to execute a television image raster across the screen 5, thus energizing the phosphor coatings 6.

As described hereinafter in detail, the electron streams may be deflected differentially by the action of the sweep coils 13 and 14, so that the coincidence of the two electron streams may be destroyed by the action of these windings. In accordance with the present invention, this difficulty is overcome by beam converging elements which serve to restore the coincidence of the electron beams by the time they reach coatings 6. In the form of the invention shown in Fig. 1, the supplementary elements include the conducting sleeve 16 which is charged in relation to the electron gun 8 by the unidirectional voltage source 17. This sleeve defines a convergent electron lens active upon the deflected electron beams to restore their coincidence. In the alternative construction of Fig. 6, a time-varying electric field is used for the same purpose. While sleeve 16 is herein shown to be maintained negative with respect to the accelerating anode of electron gun 8, an electrostatic lens may be formed with a positive potential applied to sleeve 16 as well.

*The high-speed electron gun 7*

Figure 3:
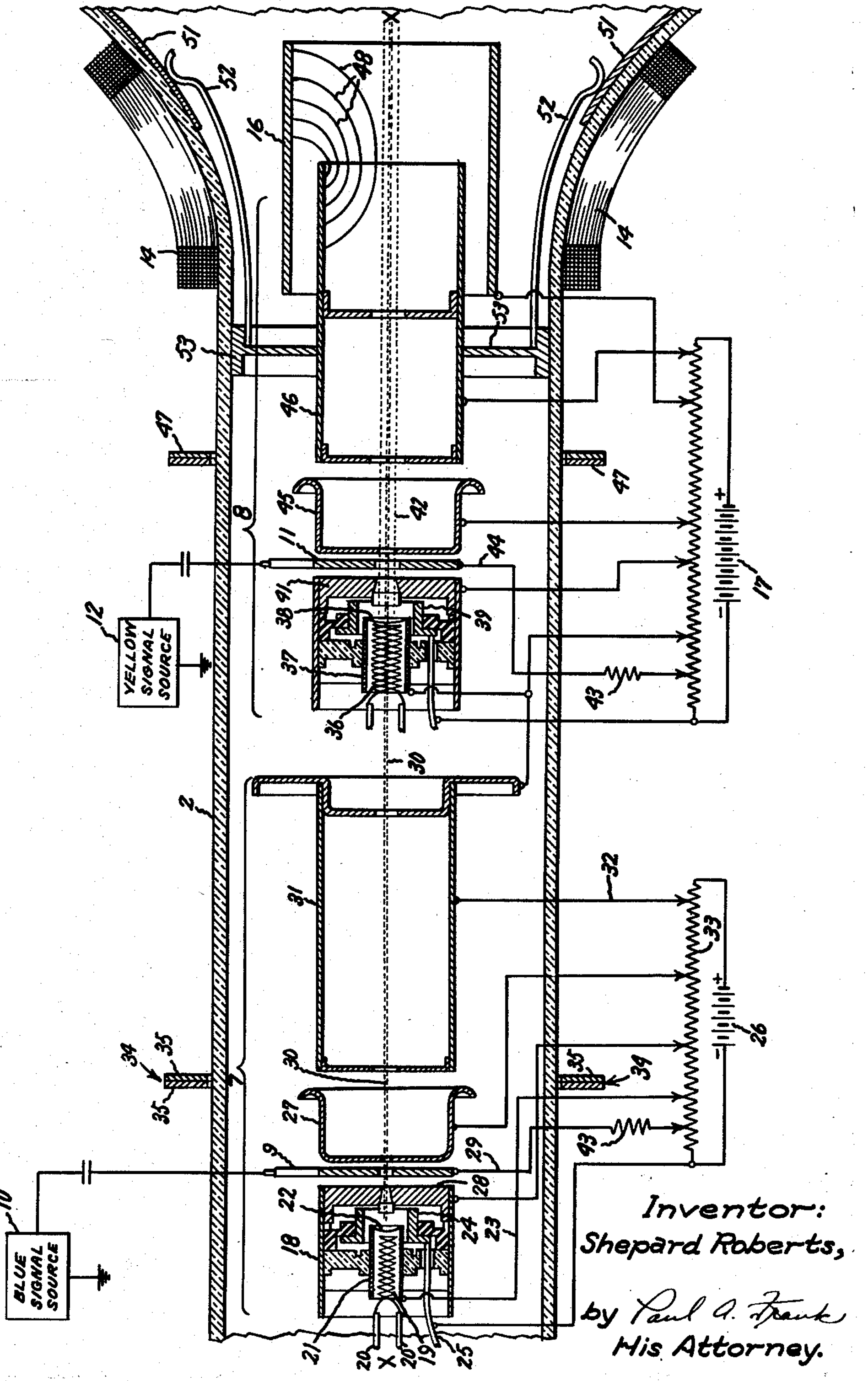
Fig. 3 is a greatly enlarged view in axial cross-section of the electron gun and sweep mechanism of the apparatus of Fig. 1 with energizing devices shown in diagrammatic form.

The construction of the electron gun 7 is shown in detail in Fig. 3. In this figure, as well as Fig. 1, the various mechanical support elements are omitted to show the construction of electrical elements more clearly. As shown, the electron gun 7 includes an electron beam forming mechanism 18. This mechanism includes a heater 19 of tungsten or similar wire wound in inner and outer oppositely spiraled helices and connected by conductors 20 to prongs in the base 3 (Fig. 1). The latter are connected to the source of heater energizing voltage (not shown). The heater 19 is located in a sleeve-like cathode 21 which is heated to electron-emissive temperature thereby. This cathode is coated at its end face 22 with a substance that readily emits electrons when heated, as is well known in the art. The cathode 21 is connected to a prong of the base 3 (Fig. 1), and thence to the cathode bias voltage source, represented generally by battery 26 and voltage divider 33. Connection thereto is represented schematically by conductor 23.

As shown in Fig. 3, a beam-defining focusing electrode 24 surrounds the cathode 21 at its forward end. This electrode likewise has a conductor 25 which is connected to a prong in base 3 and thence to external circuits. However, for purposes of illustration, and to indicate the relative values of the electrode energizing voltages, the electrode 24 and conductor 25 are shown connnected to the illustrative unidirectional voltage source 26 so as to maintain electrode 24 negative with respect to cathode 21. A weak converging lens is defined with accelerating anode 31 by the sleeve-shaped anode electrode 27 which is connected to source 26 to receive a positive voltage in relation to the electrode 24. This anode electrode serves to unify the electron beam and minimize its own divergent tendencies. The electron beam is also shaped by the electric field established between focusing electrode 24 and first accelerating anode 28, which has a small circular aperture which may, for example, be about 0.028″ in diameter. Also intermediate the electrodes 24 and 27, the electron beam passes through the aperture in the control electrode 9, which aperture may, for example, be 0.060″ in diameter. As above described with reference to Fig. 1, this electrode receives a time-varying voltage from the blue signal source 10 and thereby serves to control the intensity or electron density of the electron beam produced by electron gun 7. The control electrode 9 receives a unidirectional bias voltage from source 26 through the medium of the conductor 29. Cathode gun 7 is described in greater detail in U.S. Patent 2,852,716 to J. M. Lafferty.

The net effect of the above described elements of the electron gun 7 is to produce a small-diameter, circular cross-section electron stream having its electron density varying with time in accordance with the time varying signals from blue signal source 10 and having a velocity determined by the portion of the voltage of source 26 that is applied to the electrode 31 that is, for example, 10 kilovolts positive in relation to the cathode 21, thus giving the electron stream 30 to 10 kilovolt energy and the corresponding velocity as it emerges from anode 31. This electron stream is illustrated at 30, Fig. 3. It may, for example, have an effective diameter of the order of 0.020″ as the beam passes through cathode 38.

A suitable magnetic centering device 34 is received over the neck-like portion of the tube 1 in registration with the electron gun 7. This provides adjustment of the axial position and direction of the electron beam 30. This device forms no part of the present invention and may be one of many such devices well known to the art. It may, for example, consist of a pair of annular magnetic plates in juxtaposed relationship and relatively rotatable in relation to neck 2 and to each other. Such plates, when magnetized diametrically with poles of like intensity, provide a magnetic field of adjustable direction and intensity that serves to shift the beam 30 as required to establish exact coincidence between the ray beam and the axis X—X of the tube.

*The low-speed electron gun 8*

The electron gun 8 is generally similar to electron gun 7. Electron gun 8 differs from electron gun 7 primarily in that all of the elements of the former have unobstructed central openings of sufficient size to pass the electron beam 30 from gun 7. Such openings may, for example, be of the order of 0.030″ in diameter or more. In addition, the electron beam forming and accelerating elements of gun 8 are adapted to form a low energy electron beam and to accelerate the two beams.

More particularly, the electron gun 8 has a heater 36 which is wound in reversed spirals similar to those of heater 19, but of increased diameter to pass the beam 30. This heater is received in the cathode sleeve 37 which, at its forward end, has a concave spherical annulus 38 coated with electron emitting material. Cathode 37 is electrically connected to accelerating anode 31. A focusing electrode 39, similar to electrode 24 of gun 7, surrounds the end of the cathode 37 and, as shown, is connected to the unidirectional voltage source 17, and maintained at a potential negative with respect to cathode 37. These elements, together with the first accelerating anode 41, serve to produce a low voltage electron stream 42 merging with the high voltage electron stream 30. The control electrode 11 is located adjacent the anode 41 and is connected by conductor 44 to a portion of the voltage from source 17 to provide bias. Resistances 43 isolate modulating electrode 11, as well as 9 from the bias source to allow the applied signal voltages to be effective. Control electrode 11 also receives a time-varying voltage from the yellow signal source 12, and thereby serves to modulate or vary the electron density in the stream 42 in accordance with the time variations of the voltage from source 12. However, the control electrode 11 does not significantly vary the electron density of the beam 30 because that beam is fully formed and developed and is traveling at a velocity corresponding to its 10 kilovolt energy when it enters cathode 38. Consequently, the negative signals applied to control electrode 11 are ineffectual to change the electron density of beam 30. In contrast, the beam 42 is traveling at a relatively low velocity and the electric field of the electrode 11 is effective in controlling the electron density of electron beam 42. The modulating action of electrode 11 upon beam 42 is similar to that of a camera iris in that the marginal electrons are first arrested and increased negative voltage cuts off successive radially inward portions of the electron stream. Thus, the beam 42 can be wholly cut off by the electrode 11 while beam 30 is substantially unaffected.

After passing through the control electrode 11, the composite electron beam passes through anode 45, which is similar to electrode 27 of electron gun 7 and defines, with anode electrode 46, a weak converging lens. The beam is then accelerated by anode electrode 46. This electrode is connected to a point on the source 17 giving, for example, a 10 kilovolt acceleration in relation to the cathode 37. Electrode 46 is connected to coating 51 upon the interior of tube 1 by a spring member 52 and a metallic collar member 53. Coating 51 may be a colloidal suspension of graphite in water and, by applying the accelerating voltage of electrode 46 along the entire path of the composite electron beam, continues to accelerate and prevent divergence of the beam.

The action of anode electrode 46 in conjunction with the cathode 37 and electrodes 39 and 45, is to accelerate the electron beam 30 by the same voltage as is imparted to beam 42. In the specific illustration shown, therefore, the electrode 46 serves to accelerate the electron beam 30 by an additional 10 kilovolts, thus imparting to that electron beam a total energy of 20 kilovolts and the corresponding velocity.

A beam centering device, such as that shown generally at 47, may be provided for the electron gun 8. Such a device may be any one of the many constructions known to the art, such as the unit 34 above described. It will be observed that the action of the centering device 47 is effective on both of the electron beams 30 and 42, although the extent of the deflection effected by this device is different for the two electron beams because of their differing velocities.

*The magnetic deflection mechanism*

Upon leaving the electron gun 8 (Figs. 1 and 3) the composite electron beam passes into the magnetic field of the vertical deflection windings 13 which straddle the space traversed by the electron beams. The beams similarly pass into the magnetic field of the horizontal deflection windings 14. Current flow in the vertical deflection windings 13 produces a magnetic field having a horizontal direction transverse to the tube and of substantially constant flux density over the area traversed by the electron beams. Similarly, current flow in windings 14 produces a vertical magnetic field of substantially constant flux density over the area traversed by the electron beams and transverse thereto. The field produced by windings 13, because of its horizontal orientation, deflects the beams in the vertical direction. The field produced by the windings 14, because of its vertical orientation, deflects the beams in the horizontal direction. The windings 13 are energized with a saw-tooth current wave of, for example, 60 repetitions per second. The windings 14 are energized with a saw-tooth current wave of, for example, 13,000 repetitions per second. The combined action of the windings under these respective sweep currents is to sweep the beams in a series of horizontal sweeps or lines across the viewing screen, with the vertical positions of the lines progressing in saw-tooth fashion up the screen to scan the entire television image, thus executing a television scanning raster.

It can be shown that the amount of the beam deflection associated with current flow in the windings 13 and 14 is in proportion to the current value in the windings (and hence the magnetic field density) and is inversely proportional to the square root of the electron beam accelerating voltage. In other words, if the beam 30 (Fig. 4) is accelerated by a voltage of 20 kilovolts and the beam 42 (Fig. 4) is accelerated by a voltage of 10 kilovolts, the beam 42 will be deflected by the current flow in windings 13 and 14 to an extent about 40% more than the ray beam 30. Accordingly, while the action of the windings 13 and 14 is to deflect the ray beams in unison horizontally and vertically across viewing screen 5, the beam 30 tends to be deflected to a lesser extent than the beam 42. Thus, in the absence of other deflecting influences, the beam 30 scans an area of smaller size than the beam 42. In the case of a conventional television deflection raster the beam 30 will execute a raster that is a smaller rectangle than that of the beam 42.

*The beam converging mechanism of Figs. 1 and 3*

In the apparatus of Figs. 1 and 3, beams 30 and 42 diverge under the action of the windings 13 and 14. This divergence is compensated by the beam converging action of the electron lens defined by the conducting sleeve 16 in conjunction with the anode 46. The negative voltage applied to the sleeve 16 in relation to the anode 46 establishes an electrostatic field having the general shape indicated by the lines 48 (Fig. 3). It will be noted that the influence of this field on the electrons varies with the extent the electrons depart from the axis X—X, the effect being greater with increased departure of the electron streams from the axis. The resultant deflection of the beams is towards the axis X—X, and hence is in direction opopsite the initial magnetic ray beam deflection.

The extent of the electron beam deflection by the electron lens action of the sleeve 16 and the anode 46 is determined by the joint values of the respective beam velocities and the distance the respective beams depart from the axis X—X. It can be shown that the deflection of an electron beam under the influence of an electrostatic field is inversely proportional to the energy of the beam and proportional to the electric field strength. Thus, the deflection of the beams (assuming that they follow like paths of travel through the anode 46 and the sleeve 16) is two times as great for the 10 kilovolt beam as for the 20 kilovolt beam. The fact is, of course, that the two beams do not follow like paths of travel, for the initial deflection of the 10 kilovolt beam under the action of the magnetic fields is about 40 percent greater than that of the 20 kilovolt beam. In consequence, the actual converging deflections of the 10 kilovolt beam under the influence of the electron lens are greater than the deflections of the 20 kilovolt beam, in part by reason of the initially greater 10 kilovolt beam deflection and in part by reason of the lower velocity of the 10 kilovolt beam.

By proper choice of electron lens effect—and specifically the voltage between the sleeve 16 and anode 46—it is possible to restore the convergence of the beams at the viewing screen under all sweep conditions. With this voltage value the electron lens deflects the low speed beam towards the axis X—X in an amount greater than the high speed ray beam—and the respective deflections vary with the extent of the magnetic ray beam sweep as required to restore coincidence. Of course, in a practical mechanism this perfect action cannot be obtained, but to an acceptable practical extent the beams are converged under all conditions of sweep current in windings 13 and 14.

Since the anode 46 and the sleeve 16 (Fig. 3) are both within the time varying magnetic fields of windings 13 and 14, there is some tendency for eddy currents in these elements. If desired, these eddy currents can be reduced by slotting these elements in the manner of a Faraday shield.

It will be noted that the above-described converging action overcomes the electron beam divergence without requiring any time varying voltages or currents. This is a decided advantage since the time-independent voltage required for sleeve 16 is readily and inexpensively obtained. In addition, it is unnecessary to provide the relatively complex circuits required to produce, shape, and synchronize time-varying voltages for application to the beam converging elements.

Figures 4, 5, 6:
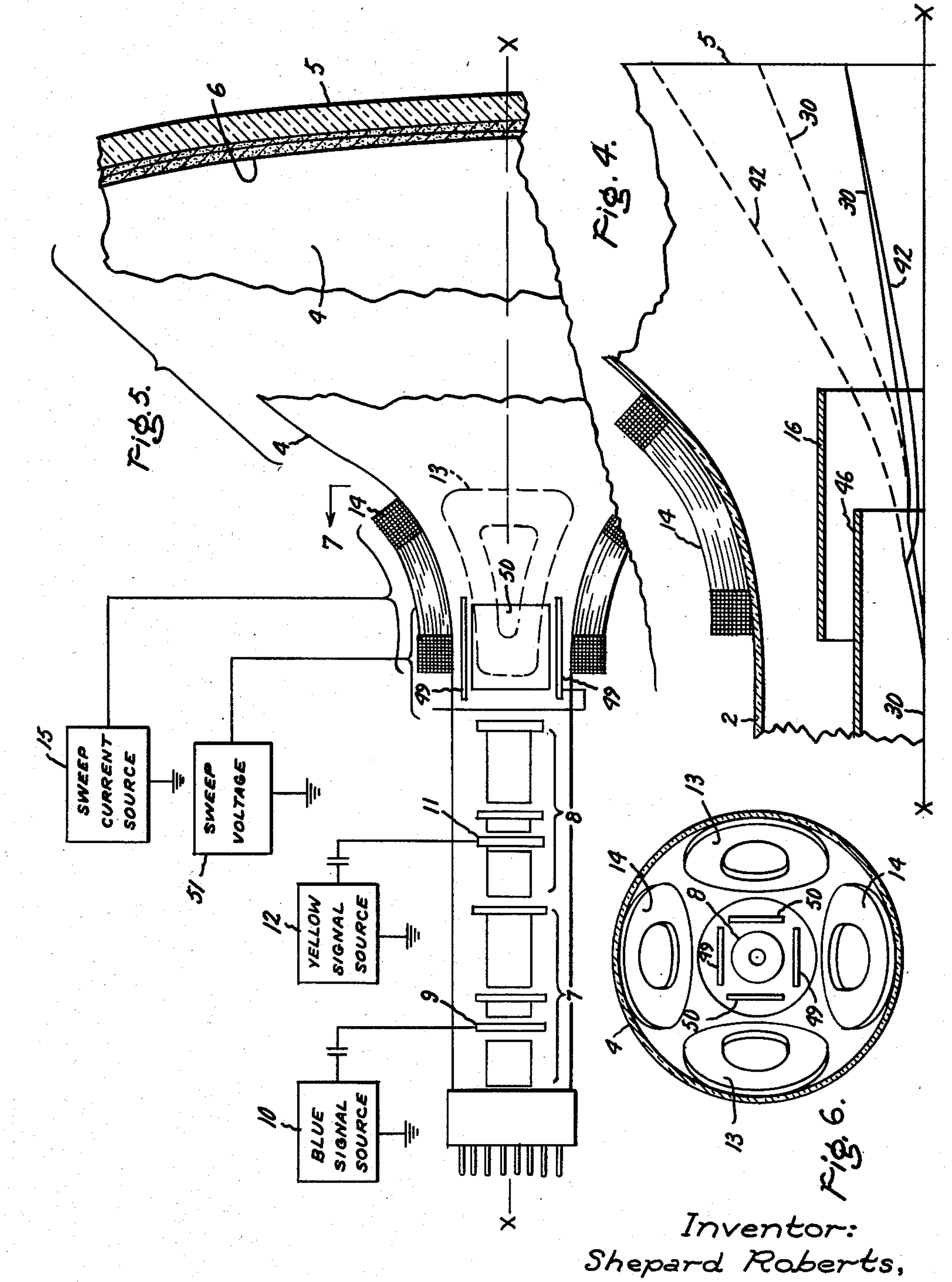
Fig. 4 is a diagrammatic representation of the paths followed by the respective electron beams of the apparatus of Figs. 1–3.
Fig. 5 is a view, generally like Fig. 1 and showing an alternative embodiment of the present invention.
Fig. 6 is a fragmentary cross-sectional view through axis 7—7, Fig. 6.

Fig. 4 shows in diagrammatic form (not to scale) the paths of beam travel in the tube of Figs. 1–3. As shown, the beams 30 and 42 are coincident and on X—X as they pass into the field of windings 13 and 14. Under the action of the windings 14 alone, the beam 42 is deflected to a greater extent than ray beam 30, as, for example, indicated by the dashed lines applicable to ray beam 42 and to ray beam 30, respectively. However, electron lens action serves to deflect the two beams toward the axis X—X and deflects beam 42 to an extent greater than beam 30. Accordingly, instead of following the dashed lines of paths of travel shown in Fig. 5, the beams follow the solid line paths as indicated and converge at the viewing screen 5.

It will be noted that magnetic sweep coils 13 and 14 act on beams and initiate deflection of the same before the beams are subjected to electron lens action. This is necessary to take advantage of the converging action of the electron lens. It also provides some of the selective action of the electron lens since the initial deflection of the low speed beam is greater than the high speed beam. It is not necessary however, that the beams undergo all of the magnetic deflection before being acted upon by the electron lens, since, as shown in Fig. 5, the electron lens may be arranged to overconverge on its own zone of influence, permitting further diverging magnetic action as shown while nevertheless bringing the two beams to coincidence on the viewing screen.

*The system of Figs. 5 and 6*

Figs. 5 and 6 are views generally like Figs. 1 and 2, but showing an alternative form of the present invention. Parts corresponding to those of Figs. 1–3 are indicated by like reference numerals on Figs. 5 and 6. In the apparatus of Figs. 5 and 6, electron gun 7 coacts with blue signal source 10 to produce a high energy electron beam having its intensity varying with time through the action of control electrode 9. This beam has an initial energy of 10 kv. Electron gun 8 acts in conjunction with yellow signal source 12 to produce low energy electron beam modulated by control electrode 11 in accordance with the time variations of the yellow signal. This electron beam is coaxial and concentric with the beam from gun 7. Electron gun 8 serves to accelerate the beam so formed by 10 kv. and to impart an additional 10 kv. acceleration to the electron beam 30 produced by electron gun 7.

The beams issuing from electron gun 8 are deflected in unison (but to different extents) by magnetic sweep windings 13 and 14. These are energized by sweep voltage source 15 and serve to deflect the electron beams as above described in connection with the apparatus of Figs. 1–3. As described above, the action of the magnetic elements is to deflect the 10 kv. beam from electron gun 8 to an extent about 40 percent greater than the 20 kv. beam, thus giving the electron beams diverging directions in relation to each other while deflecting them in unison.

The system of Figs. 5 and 6 includes vertical electrostatic deflection plates 49 and horizontal electrostatic deflection plates 50. Voltages from sweep voltage source 51 are applied to these respective sets of plates to sweep the beams in converging relationship (as compared with the diverging effects of windings 13 and 14) as hereinafter described. Sweep voltage source 51 applies a voltage across the horizontal plates 49 that is of saw-tooth shape having a repetition rate of, for example, 60 per second and in synchronism with the saw-tooth current applied to vertical deflecting windings 13 by sweep current source 15. Similarly, sweep voltage source 51 applies a voltage across vertical plates 50 having saw-tooth shape and having wave shape and repetition rate like the current applied to windings 14 and in synchronism with that current.

The voltages applied by source 51 to plates 49 and 50 are of polarity to deflect the beams in opposite sense to the deflections associated with the current flow in windings 13 and 14. The amount of such opposed deflection, however, varies in accordance with the beam velocities and can be shown to be substantially inversely proportional to the energies of the ray beams. Thus, the 10 kv. electron beam is deflected about two times as much as the 20 kv. electron beam.

The actual voltage applied to the electrostatic deflection plates by source 51 is chosen to impart a converging travel to the respective beams that offsets the diverging action of magnetic ray beam deflecting coils 13 and 14. Accordingly, the beams are caused to converge at least at phosphor coatings 6, Fig. 6, and thus are swept in unison and in coincident relationship over the viewing screen.

It will be noted that in each form of the invention herein described, the electron beams of unlike velocities are formed in a substantially coincident beam which is deflected by a main set of deflection elements which may impart divergence to the electron beams. This divergence is overcome, and the beams are caused to coincide on the viewing screen, by the action of other elements that are effective in opposing differential fashion on the two electron beams. In the form of Fig. 3 these elements are an electrostatic electron lens which receives only the time-independent voltage required for lens action. In the form of Figs. 5 and 6, these elements are a separate electrostatic deflection system. In each instance, the action of the main deflection system is opposed to some extent by the secondary deflection system, but the effect is greater on the low speed beam than the high speed beam by an amount that overcomes the divergence produced by the magnetic action. The net effect is to deflect the ray beams while maintaining their coincidence at the viewing screen.

While the described embodiments include converging means so as to render the devices and systems thereof completely operative under all circumstances these means are not essential in all embodiments. Thus, for example, screen 5 may be formed of transparent phosphor films, the optimum excitation energy of which are so close together that little divergence of the electron beams is encountered in the deflection thereof. While the apparatus specifically described herein utilizes two constructions for the purpose, it will of course be understood that other arrangements may be used.

The electron efficiency of the multicolor image display system of the present invention is very good, especially as compared with system using beam intercepting elements of one kind or another. In the present system essentially all of the electrons passing from electron gun 8 are effective in striking the viewing screen and producing light from one phosphor or the other. It will also be noted that there is no need to separate the various color components of the electron beams on a time basis or to produce switching voltages required for selection between the beams on a time basis. Rather, the electron beam from electron gun 7 is modulated in accordance with one color signal and the electron beam from electron gun 8 is modulated in accordance with the other color signal and no auxiliary switching means is required. It is, accordingly, unnecessary to provide color switching systems operating at very high frequencies, such as the megacycle switching signals required for some forms of color television image presentation.

The above description is based upon a specific set of electron beam accelerating voltages and a specific set of colored light producing phosphors. It will, of course, be understood that the specific voltages and the specific phosphors form no part of the present invention and that other voltages and other phosphors can be used, if desired. Similarly, while the above description refers to deflection of the beams in a television image raster, it will be understood that the apparatus of the invention is adapted to other forms of beam deflection and image display including, for example, radar image display systems. Additionally, although one specific structure has been shown as the preferred embodiment of electron guns 7 and 8, the broader aspect of the invention includes any pair of electron guns adapted to provide concentric electron beams of different velocities.

Thus, although the dual electron gun structures shown in Figs. 1 and 3 produce a composite beam of two different electron energies and both components occupy substantially the same space, other arrangements may be utilized. For example, electron gun 8 could be adapted to produce an annular electron beam which would then surround and be concentric with the beam produced by electron gun 7. As used in the instant specification and the appended claims, the words "concentric" and "coaxial" are intended to be descriptive of both the arrangement wherein two different-velocity beam components occupy the same space and are collinear and the arrangement in which one component has an annular cross-section and surrounds the other component.

Electron beams 30 and 42 have total current values of a few milliamperes. Consequently, the space actually occupied by the electrons in each is very small in relation to the total space occupied by the beams. In other words the electron densities are very low. The respective beams can, accordingly, cross, separate, and converge without a substantial number of electron collisions or substantial interaction between the beams.

While I have shown and described specific embodiments of the present invention it will of course be understood that various modifications and alternative constructions may be made without departing from the true spirit and scope thereof. Thus, for example, the two-part deflection system, in addition to the disclosed embodiments, could be comprised of a first, electrostatic deflection system supplied with a time-varying voltage, and a second, electromagnetic deflection system supplied with a time-independent voltage. I therefore intend, by the appended claims to cover all such modifications and alternative instructions as fall within their true spirit and scope.

What I claim as new and desire to secure by Letters Patent of the United States is:

1. A multicolor cathode ray image display system comprising in combination: a cathode ray tube having an axis; a plurality of electron guns operable to produce electron beams substantially coincident with said axis and of differing velocities, and a viewing screen located along said axis and having phosphors responsive to electron beams of said velocities, respectively, to produce illumination of differing colors, respectively; magnetic means operable to sweep said beams in unison across said viewing screen, said means diverging said electron beams; and secondary deflection means operable to deflect said beams differentially, in sense opposite to the diverging deflection of said beams under the influence of the magnetic means, and in amount to restore the substantial coincidence of the beams as they reach the viewing screen.

2. A multicolor cathode ray device comprising in combination: an evacuable envelope having a faceplate at one end thereof and a neck-like portion at the other end thereof; a plural layer phosphor screen upon said faceplate and including a first layer of phosphor adapted to emit a first color light when excited by a beam of electrons having a first velocity and a second layer of phosphor adapted to emit a second color light when excited by a beam of electron beams having a second velocity; means within said neck-like portion generating a first beam of electrons; means within said neck-like portion generating a second beam of electrons concentric with said first beam of electrons; and means to accelerate said beams to said first and said second velocities respectively to cause the emission of said colors from said phosphor screen.

3. A multicolor cathode ray image display system comprising in combination: a cathode ray tube having an axis, at least two electron guns operable to produce electron beams substantially coincident with said axis and of differing velocities, and a viewing screen located along said axis and having phosphors responsive to electron beams of said velocities, respectively, to produce illumination of differing colors, respectively; magnetic sweep means operable to deflect said beams and diverging the same, and means defining a convergent electron lens operative on said beams after at least partial deflection by said magnetic means and in amount to maintain the coincidence of said ray beams at the viewing screen.

4. A multicolor cathode ray device comprising in combination: an evacuable envelope having at one end thereof a faceplate and at the opposite end thereof a neck-like portion; a plural layer phosphor screen upon said faceplate and including a first layer of phosphor adapted to emit a first color light when excited by a beam of electrons having a first velocity and a second layer of phosphor adapted to emit a second color when excited by a beam of electrons having a second velocity; means within said neck-like portion generating a first electron beam; means within said neck-like portion generating a second beam of electrons concentric with said first beam, said last named means having an axial passage therethrough to permit unobstructed passage of said first beam therethrough; means accelerating said beams to said velocities to cause the emission of said colors from said phosphor screen, and means for deflecting said first and said second electron beams in coincidence over said faceplate in a predetermined pattern.

5. A multicolor cathode ray image display system comprising in combination: a cathode ray tube having an axis, at least two electron guns operable to produce electron beams substantially concentric with said axis and of differing velocities, and a viewing screen located along said axis and having phosphors responsive to electron beams of said velocities, respectively, to produce illumination of differing colors, respectively; magnetic sweep coils operable to produce sweep magnetic fields crosswise of said electron beams; means to energize said sweep coils to sweep the ray beams by magnetic action across said viewing screen while imparting divergence thereto; and means defining a time-independent beam deflecting field with increased beam deflection action away from said axis and of direction to deflect said beams toward said axis, said field being active on said electron beams after they enter the fields of said sweep coils and having variations in strength of amount to restore the coincidence of said beams at the viewing screen.

6. A multicolor cathode ray image display system comprising in combination: a cathode ray tube having an axis; at least two electron guns operable to produce electron beams substantially concentric with said axis and of differing velocities, one of said guns terminating in a conducting sleeve on said axis through which both beams emerge, and a viewing screen located on said axis and having phosphors responsive to electron beams of said velocities, respectively, to produce the emission of differing colors, respectively; magnetic sweep coils operable to produce sweep magnetic fields transverse to said electron beams, said fields being in the path of the electron beams as they emerge from said sleeve; means to energize said sweep coils to sweep said beams by magnetic action across said viewing screen while imparting divergence thereto; a conducting sleeve on said axis of greater diameter than said first sleeve, telescoped in part over the end of said first sleeve, and extending into the confines of said sweep magnetic fields; and means charging said last sleeve in relation to said first sleeve in amount to restore the coincidence of said beams at the viewing screen.

7. A multicolor cathode ray image display system comprising in combination: a cathode ray tube having an axis, at least two electron guns operable to produce electron beams substantially concentric with said axis and of differing velocities, means defining electrostatic deflection plates effective on said beams, and a viewing screen located along said axis and having phosphors responsive to electron beams of said velocities, respectively, to produce illumination of differing colors, respectively; magnetic sweep coils operable to produce sweep magnetic fields transverse of said electron beams; and means to energize said sweep coils and said electrostatic deflection plates with time varying currents and voltages, respectively, of like wave shapes to sweep said beams by magnetic action across said viewing screen and to converge said beams by electrostatic action in amount and sense to overcome the beam divergence associated with said magnetic deflection action and bring said beams to coincidence at the viewing screen.

8. A multicolor cathode ray image display system comprising in combination: a cathode ray tube having an axis, a first electron gun operable to produce an electron beam of predetermined velocity along said axis, a second electron gun operable to produce an electron beam of predetermined different velocity along said axis, said beams each having low electron density, and a viewing screen located along said axis and having phosphors responsive to electron beams of said velocities, respectively, to produce emission of differing colors, respectively; two-part means operable to deflect said electron beams in unison across the viewing screen, said means including first parts operative by magnetic action to deflect said beams while imparting divergence thereto and second parts operative by electrostatic action and effective to deflect the beams in converging direction in amount substantially equal to the diverging ray beam deflection due to magnetic action and in sense to maintain the coincidence of said ray beams at said viewing screen.

9. A multicolor cathode ray image display system comprising in combination: a cathode ray tube having an axis, a first electron gun operable to produce a first electron beam of predetermined high velocity along said axis, a second electron gun operable to produce a second electron beam of a predetermined lower velocity along said axis, means operable to modulate said second beam in iris-like fashion to vary the value thereof without affecting said first high velocity beam, said beams each having low electron density, and a viewing screen located along said axis and having phosphors responsive to electron beams of said velocities, respectively, to produce emission of differing colors, respectively; two-part means operable to deflect said electron beams in unison across the viewing screen, said means including first parts operative by magnetic action to deflect said beams while imparting divergence thereto and second parts operative by electrostatic action and effective to deflect said beams in opposite sense to the first deflection and in unlike amounts to converge said beams at the viewing screen.

10. A multicolor cathode ray image display system comprising in combination: means defining a vacuum envelope having an axis and a viewing screen on said axis, the viewing screen having phosphors responsive to electron beams of predetermined differing velocities corresponding to predetermined different beam energies; a first electron gun in said envelope disposed to produce a first electron beam on said axis and towards said viewing screen with energy equal to the differences between said energies; a second electron gun in said envelope disposed between said first electron gun and said viewing screen, said second electron gun having its elements apertured to pass said first electron beam, said second electron gun further having elements operative to produce a second electron beam concentric with said first electron beam and directed towards the viewing screen; means associated with said second electron gun to accelerate both beams by the least of said energies, thereby imparting to said first electron beam a velocity sufficient to excite one phosphor on said screen and to said second electron beam a velocity sufficient to excite the other phosphor on said screen; means magnetically operative on said beams to sweep the same across the viewing screen; and elements electrostatically operative on said beams to converge the same on the viewing screen notwithstanding any divergence caused by said last named means.

11. A multicolor cathode ray image display system comprising in combination: means defining a vacuum envelope having an axis and a viewing screen on said axis, the viewing screen having phosphors responsive to electron beams of predetermined differing velocities corresponding to predetermined different energies; a first electron gun in said envelope and disposed to produce a first electron beam on said axis and towards said viewing screen with an energy equal to the difference between said energies; a second electron gun in said envelope disposed between said first electron gun and said viewing screen, said second electron gun having its elements apertured to pass said first electron beam, said second electron gun further having elements operative to produce a second electron beam concentric with said first electron beam and directed towards the viewing screen; means associated with said electron gun to modulate said second beam in iris action to control the same without modulating said first electron beam; means associated with said second electron gun to accelerate both of said beams with the least of said energies thereby imparting to said first beam a velocity sufficient to excite one phosphor on said screen and to said second beam a velocity sufficient to excite another phosphor on said screen; means magnetically operative on said beams as they emerge from the second electron gun to sweep the same across the viewing screen; and elements defining an electron lens in conjunction with the second electron gun to converge said beams on the viewing screen notwithstanding any divergence caused by said last named means.

12. A multicolor cathode ray image display system comprising in combination: a cathode ray tube having an axis; a plurality of electron guns operable to produce electron beams substantially coincident with said axis and of differing velocities, and a viewing screen located along said axis and having phosphors responsive to electron beams of said velocities, respectively, to produce illumination of differing colors, respectively; first means operable to sweep said beams in unison across said viewing screen, said means diverging said electron beams; and secondary deflection means operable to deflect said beams differentially, in sense opposite to the diverging deflection of said beams under the influence of the first means, and in amount to restore the substantial coincidence of the beams as they reach the viewing screen.

13. A multicolor cathode ray image display system comprising in combination: a cathode ray tube having an axis, a first electron gun operative to produce an electron beam of predetermined velocity along said axis, a second electron gun operative to produce an electron beam of predetermined differing velocity along said axis, said beams each having low electron density, and a viewing screen located along said axis and having phosphors responsive to electron beams of said velocities, respectively, to produce emission of differing colors, respectively; two-part means operable to deflect said electron beams in unison across said viewing screen, said means including first parts operative by electrostatic forces to deflect said beams in a first direction away from said axis while incidentally imparting divergence thereto, and second parts operative by magnetic action to deflect said beams in a direction away from said axis and opposite in sense to said first direction and to simultaneously cause convergence of said beams and coincidence thereof at said viewing screen.

References Cited in the file of this patent

UNITED STATES PATENTS

| | | |
|---|---|---|
| 2,442,961 | Ramberg | June 8, 1948 |
| 2,726,348 | Benway | Dec. 6, 1955 |
| 2,831,918 | Dome | Apr. 22, 1958 |
| 2,861,208 | Benway | Nov. 18, 1958 |